Jan. 27, 1953  C. P. GESNER  2,626,638
TOOL SUPPORTING ARM FOR RADIAL SAWS
Filed March 31, 1949
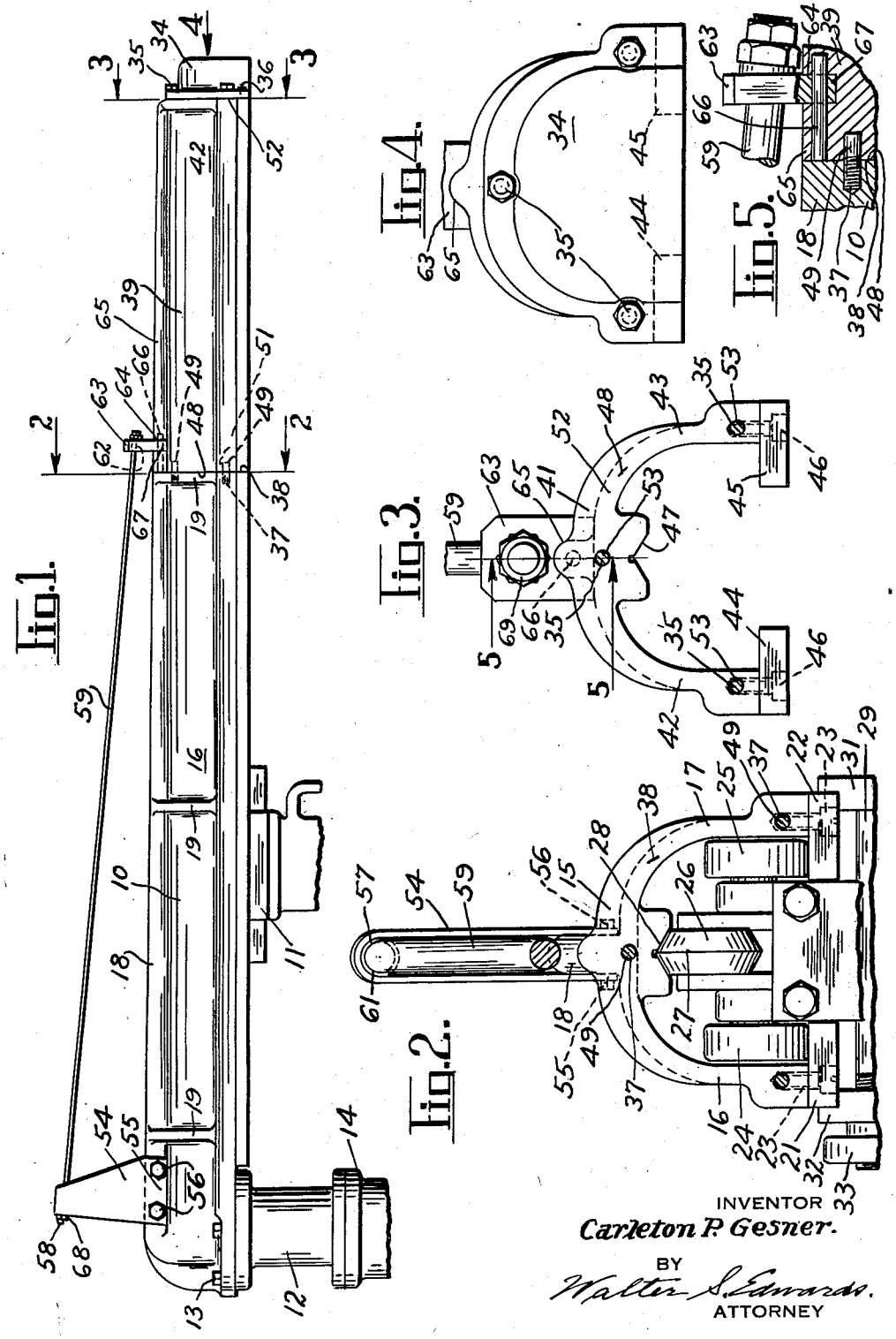
INVENTOR
*Carleton P. Gesner.*
BY
*Walter S. Edwards.*
ATTORNEY

Patented Jan. 27, 1953

2,626,638

UNITED STATES PATENT OFFICE 2,626,638

TOOL SUPPORTING ARM FOR RADIAL SAWS

Carleton P. Gesner, New Haven, Conn.

Application March 31, 1949, Serial No. 84,653

4 Claims. (Cl. 143—7)

This invention relates to tool supporting arms for radial saws, or like machines, and more particularly to an arm of like nature which is adapted to be readily extended to provide additional movement of the tool carried thereby across work supported upon a table disposed beneath the arm.

One object is to provide, in a radial saw, an improved tool, or saw, supporting arm which is adapted to be readily lengthened to provide an increase in range of movement of the tool across the work.

Another object is to provide a radial saw carriage supporting arm of such structure that an additional length of arm may be readily attached thereto to increase the length of the arm.

Still another object is to provide in a radial saw, a tool carriage supporting arm and an extension therefor in combination with novel means for securing the same together.

A further object of this invention is to provide an arm of the above nature for a radial saw, or like machine which will be relatively inexpensive to manufacture, simple in construction, compact, of pleasing appearance, and very efficient and durable in use.

With these and other objects in view, which will appear as the description proceeds there has been illustrated in the accompanying drawings, one form of arm in which the features and principles of this invention may be conveniently and practically embodied.

In the drawings:

Figure 1 is a side view of a tool supporting arm for use in combination with a radial saw, or like machine;

Figure 2 is an enlarged cross-sectional view taken on the line 2—2 of Figure 1;

Figure 3 is a cross-sectional view taken on the line 3—3 of Figure 1;

Figure 4 is an end view looking in the direction of arrow 4 of Figure 1; and

Figure 5 is a broken sectional view taken on the 5—5 of Figure 3.

The tool supporting arm 10 illustrated in the drawings is particularly adapted for use on a radial saw of the form shown and described in my copending application Serial No. 712,275, filed November 26, 1949, now Patent No. 2,584,863, and wherein a tool in the form of a circular saw is its reciprocating movements along the arm 10, supported from and carried by a carriage 11 in The arm 10 is secured at its rear end to a spindle 12 by bolts 13. The spindle 12 is rotatably mounted in a cylinder 14 and is movable therein for vertical adjustment toward and away from a work supporting table (not shown), to which the standard 14 is secured and extends upwardly from.

The arm 10 is inverted U-shaped in cross-section having an upper base portion 15 and depending side portions 16 and 17. The arm 10 is reinforced by a lengthwise rib 18 which extends substantially the entire length of the arm on the upper surface of the base portion 15. Cross ribs 19 extend about the arm 10 and are spaced apart lengthwise thereof. The bottom edge surface of each of the legs, or side portions, 16 and 17 is flat and said surfaces are in transverse alignment with each other. Carriage supporting tracks 21 and 22 comprising long flat bars extend substantially the length of the arm 10 and are secured upon and to the bottom edge surface of the side portions 16 and 17 respectively by a plurality of screws 23 which are spaced apart lengthwise of the tracks and of the arm 10. The tracks 21 and 22 extend inwardly from the respective side portions 16 and 17, and flat faced rollers 24 and 25, journaled to the carriage 11, ride upon the upper surface of the inwardly extending portion to support the carriage as it is reciprocated along and in the arm 10. Another roller 26, journaled to the carriage 11, and having a V-shaped rib 27 about its periphery is arranged to ride in an inverted V-shaped track 28 provided upon the undersurface of the arm base portion 15 to guide the carriage as it reciprocates in the arm while being supported upon the tracks 16 and 17 by the rollers 21 and 22. A more detailed description of the carriage assembly 11 is included in a copending application of Edwin E. Gesner, Serial No. 84,569, filed March 31, 1949.

A carriage locking device is provided which includes a rod 29, extending through and thus carried by the carriage 11. A clamp lug 31 is secured to one end of the rod 29 in position to engage the outer edge surface of the track 22 and another lug 32 is slidingly disposed at the other end of the rod 29 in position to engage the outer edge surface of the track 21. A hand wheel 33 threaded upon the last mentioned rod end is adapted to act upon the lugs 31 and 32 to draw them together into clamping relation with the tracks 22 and 21 respectively to lock the carriage 11 whenever it is desired, along the arm 10. An end cap 34 is provided to cover the outer and free end of the arm 10 and to act as a stop to limit the forward movement of the carriage 11 along the arm 10. This cap 34 is adapted to be secured to the arm end by screws 35 which pass through a flange 36 of the cap 34 and thread into threaded holes 37 in the flat end 38 of the arm 10.

An arm extension 39 is provided for the purpose of increasing the length of the arm 10 so as to allow for a longer travel of the carriage 11 across work supported on the table over which the arm 10 extends. The arm extension 39 is U-shaped in cross-section and is provided with a base portion 41 and side portions 42 and 43, which portions are similar in form to the arm 10. Extension bars 44 and 45 are similar in form to the tracks 21 and 22 and are secured to the arm extension by spaced apart screws 46. The arm extension 39 is also provided with a V-shaped track 47 similar to the V-shaped track 28. The rear end face 48 of the arm extension 39 is flat and is adapted to abut against the end face 38 of the arm 10 in such a manner that the tracks 44 and 45, and track 47 will lie in lengthwise alignment. To insure that the abutting ends of the arm 10 and arm extension 39 are properly located in respect to each other pins 49 are threaded into the threaded holes 37 in the arm end face 38 and extend into holes 51 provided in the arm extension end face 48. The front, or outer, end 52, of the arm extension 39, is provided with threaded holes 53 located in proper position to receive the screws 35 to attach the cap 34 upon the end 52.

Means is provided to insure that the abutting end faces 38 and 48 are maintained in tight relationship and thus properly hold the arm extension in position to obtain perfect alignment of the tracks 44 and 45, and track 47 with the tracks 21 and 22, and track 23 respectively, to reinforce the completely extended arm to compensate for the weight of the carriage 11 when it is moved along into and upon the arm extension 39, and to removably secure the arm extension 39 to the arm 10. This securing means comprises, in this instance, a bracket 54 having a bifurcated base 55 which straddles the lengthwise rib 18 adjacent the rear end of the arm 10 and is secured thereto by bolts 56. The bracket 54 is provided with a hole 57 through which one end 58 of a rod 59 passes. The bracket shown is made of sheet metal bent over a bushing 61 and extended downwardly to straddle the rib 18.

The rod 59 extends forwardly, and is inclined downwardly to enter and pass through a hole 62 provided in the upper end of a lug 63. The lug 63 is seated in a cross slot 64 cut through the arm extension 39, in this instance through a lengthwise reinforcing rib 65 formed on the upper surface of the base portion 41. A pin 66 is driven into the arm extension 39 from the rear surface 48 and extends into and through the lower end 67 of the lug 63 to lock it in place. Nuts 68 are threaded onto the rear end of the rod 59 and nuts 69 are threaded onto the front end of the rod 59 whereby the bracket 54 and the lug 63 may be drawn togethher to tightly force the arm extension 39 against the arm 10 and lock the extension in its properly located position.

By the provision of the bracket 54, located on the arm 10 adjacent its rear end and above where it is attached to the spindle 12, the lug 63 located adjacent the rear end of the arm extension 39, where its end surface 48 abuts the end surface 38 of the arm 10, and the rod 59, connecting the bracket and lug, the additional strain of the arm extension 39 and the carriage 11, when it is moved onto this arm extension, is transmitted directly to the spindle 12 and thus does not tend to deflect the arm 10 downwardly. By the locating and supporting means for the arm extension above described the tracks 21, 22 and 44, 45, and the tracks 23 and 47 are positioned and maintained in perfect alignment.

While there has been shown and described herein a tool supporting arm for radial saws, and like machines, in which the features and principles of this invention may be embodied in practice, it will be understood that the same may be embodied in other specific forms without departing from the spirit and essential attributes thereof, and it is therefore desired that the present embodiment be considered in all respects as illustrative, and not restrictive, reference being had to the claims rather than to the foregoing description to indicate the scope of the invention.

Having thus fully disclosed the invention, what is claimed as new and for which it is desired to secure Letters Patent, is:

1. A support for a tool carriage comprising a supporting arm member, means supporting one end thereof, said supporting arm being adapted to support a tool carriage for reciprocating movement longitudinally of said arm, an arm extension member for the distal end of said supporting arm permitting further outward movement of said carriage, and means rigidly and detachably connecting said members.

2. A support for a tool carriage comprising a supporting arm member, means supporting one end thereof, said supporting arm being adapted to support a tool carriage for reciprocating movement longitudinally of said arm, an arm extension member for the distal end of said supporting arm permitting further outward movement of said carriage, means rigidly and detachably connecting said members, said means comprising a dowel carried by one of said members and received by the other of said members, one of said members having a part in fixed relationship thereto, the other of said members having a part in fixed relationship thereto, and a tie rod extending between said parts and detachably associated with one of said parts.

3. A support for a tool carriage comprising a spindle, a supporting arm member rotatably supported on said spindle at one end of said arm, said supporting arm being adapted to support a tool carriage for reciprocating movement longitudinally of said arm, an arm extension member for the distal end of said supporting arm permitting further outward movement of said carriage, and means rigidly and detachably connecting said members.

4. A support for a tool carriage comprising a supporting arm member, means supporting one end thereof, said supporting arm being adapted to support a tool carriage for reciprocating movement longitudinally of said arm, an arm extension member extending from the distal end of said supporting arm permitting further outward movement of said carriage, means rigidly and detachably connecting said members, a part detachably connected to the outer end of said arm extension providing a stop to limit outward movement of said carriage, said part being attachable to the distal end of said supporting arm when said arm extension is detached.

CARLETON P. GESNER.

REFERENCES CITED

The following references are of record in the file of this patent:

UNITED STATES PATENTS

| Number | Name | Date |
|---|---|---|
| 121,374 | Jackson | Nov. 28, 1871 |
| 922,885 | Gourlay | May 25, 1909 |
| 1,794,836 | De Walt | Mar. 3, 1931 |
| 1,815,037 | De Walt | July 21, 1931 |
| 1,859,136 | Goodrich | May 17, 1932 |
| 1,920,370 | Forsythe et al. | Aug. 1, 1933 |
| 1,984,492 | Peace | Dec. 18, 1934 |
| 2,343,243 | Roemer | Mar. 7, 1944 |
| 2,383,195 | Horman | Aug. 21, 1945 |

FOREIGN PATENTS

| Number | Country | Date |
|---|---|---|
| 55,873 | Switzerland | Mar. 4, 1911 |